United States Patent
Perkins et al.

(10) Patent No.: US 10,724,201 B2
(45) Date of Patent: *Jul. 28, 2020

(54) TANK BASE

(71) Applicant: ASSET GUARD PRODUCTS INC., Houston, TX (US)

(72) Inventors: Larry L. Perkins, Southlake, TX (US); Tim Kriegshauser, Southlake, TX (US)

(73) Assignee: ASSET GUARD PRODUCTS INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/683,001

(22) Filed: Nov. 13, 2019

(65) Prior Publication Data

US 2020/0080274 A1 Mar. 12, 2020

Related U.S. Application Data

(63) Continuation of application No. 15/230,890, filed on Aug. 8, 2016, now Pat. No. 10,526,761, which is a (Continued)

(51) Int. Cl.
*E02D 27/38* (2006.01)
*B65D 90/24* (2006.01)
(Continued)

(52) U.S. Cl.
CPC ............. *E02D 27/38* (2013.01); *B65D 90/24* (2013.01); *C08J 7/0427* (2020.01); *E02D 27/01* (2013.01);
(Continued)

(58) Field of Classification Search
None
See application file for complete search history.

(56) References Cited

U.S. PATENT DOCUMENTS

| 4,078,348 A | 3/1978 | Rothman |
| 4,355,844 A | 10/1982 | Fantini Muzzarelli |

(Continued)

FOREIGN PATENT DOCUMENTS

| EP | 1514885 | 3/2005 |
| EP | 1514885 A1 | 3/2005 |

(Continued)

OTHER PUBLICATIONS

Agreed Motion for Amended Scheduling Order, *Asset Guard Products Inc., d.b.a. Falcon Technologies and Services, Inc.,* v. *Sentinel Manufacturing, Inc.* (f/k/a Sentinel Containment, Inc.), in the United States District Court for the Southern District of Texas, Houston Division, Civil Action No. 4:17-CV-00971, Sep. 10, 2018, 3 pp. 64087055 (1).

(Continued)

*Primary Examiner* — Brian E Glessner
*Assistant Examiner* — Adam G Barlow
(74) *Attorney, Agent, or Firm* — Patterson + Sheridan, LLP

(57) ABSTRACT

A method for the construction of an improved tank base. A tank base is constructed for protection against accidental spills and/or leaks associated with a tank battery. The improved tank base comprises at least one part of a suitable substrate, which allows for the adhesion of an elastomer such as polyurea. Polyurea is preferably applied using a spray device which yields an average coverage of about 50-80 mils, and most preferably 60 mils. If more than one substrate is used, one or more substrates can be bound together with a fastening system. Once pressure is applied in the form of weight, the fastening system can be removed, resulting in an improved tank base having at least one seam and impervious to the fluid of the tank battery.

30 Claims, 4 Drawing Sheets

Related U.S. Application Data continuation of application No. 14/285,898, filed on May 23, 2014, now Pat. No. 9,410,302, which is a continuation of application No. 12/365,781, filed on Feb. 4, 2009, now Pat. No. 8,734,052.

(60) Provisional application No. 61/106,778, filed on Oct. 20, 2008.

(51) Int. Cl.
  *C08J 7/04* (2020.01)
  *E02D 27/01* (2006.01)
  *E04H 7/02* (2006.01)

(52) U.S. Cl.
  CPC ............ *E04H 7/02* (2013.01); *C08J 2325/04* (2013.01); *C08J 2475/00* (2013.01); *E02D 2200/1621* (2013.01); *E02D 2300/0006* (2013.01); *Y10T 428/269* (2015.01); *Y10T 428/31938* (2015.04)

(56) References Cited

U.S. PATENT DOCUMENTS

| | | | |
|---|---|---|---|
| 4,765,775 A | 8/1988 | Kroger | |
| 4,802,322 A | 2/1989 | Bendfeld | |
| 4,844,287 A | 7/1989 | Long | |
| 4,865,899 A | 9/1989 | Reichert | |
| 4,917,537 A | 4/1990 | Jacobson | |
| 5,105,746 A | 4/1992 | Reynolds | |
| 5,281,055 A | 1/1994 | Neitzke et al. | |
| 5,317,076 A | 5/1994 | Primeaux, II | |
| 5,401,456 A | 3/1995 | Alesi, Jr. et al. | |
| 5,447,389 A | 9/1995 | Olson | |
| 5,454,195 A | 10/1995 | Hallsten | |
| 5,549,418 A | 8/1996 | Devine et al. | |
| 5,679,432 A | 10/1997 | Holmquest et al. | |
| 5,814,693 A | 9/1998 | Priest et al. | |
| 5,882,142 A | 3/1999 | Siglin et al. | |
| 5,895,025 A | 4/1999 | Alesi et al. | |
| 6,026,760 A | 2/2000 | Phillips et al. | |
| 6,315,495 B1 | 11/2001 | Starheim | |
| 6,327,722 B1 | 12/2001 | Noble | |
| 6,418,861 B1 | 7/2002 | Flam | |
| 6,695,534 B2 | 2/2004 | Cain et al. | |
| 6,841,111 B2 * | 1/2005 | Rickner | B29C 41/003 264/250 |
| 6,854,926 B2 | 2/2005 | Siglin et al. | |
| 6,877,189 B2 | 4/2005 | Simonson et al. | |
| 7,114,210 B2 | 10/2006 | Heinz | |
| 7,494,298 B2 | 2/2009 | Perkins | |
| 7,946,439 B1 | 5/2011 | Toscano et al. | |
| 8,734,052 B2 * | 5/2014 | Perkins | B65D 90/24 405/52 |
| 9,410,302 B2 | 8/2016 | Perkins et al. | |
| 2002/0137871 A1 | 9/2002 | Wheeler et al. | |
| 2005/0029425 A1 | 2/2005 | Garton | |
| 2005/0058838 A1 | 3/2005 | Markusch et al. | |
| 2005/0158131 A1 | 7/2005 | Markusch et al. | |
| 2006/0027794 A1 | 2/2006 | Heinz | |
| 2006/0057394 A1 | 3/2006 | Cork | |
| 2006/0122320 A1 | 6/2006 | Cahill et al. | |
| 2007/0208156 A1 | 9/2007 | Posey et al. | |
| 2007/0208157 A1 | 9/2007 | Posey et al. | |
| 2008/0003060 A1 | 1/2008 | Perkins | |
| 2008/0047210 A1 | 2/2008 | Bell | |
| 2008/0092730 A1 | 4/2008 | Hall | |
| 2009/0151791 A1 | 6/2009 | Perkins | |
| 2009/0324335 A1 * | 12/2009 | Fossen | B65D 90/24 405/116 |
| 2009/0324336 A1 | 12/2009 | Fossen et al. | |
| 2010/0098371 A1 | 4/2010 | Perkins et al. | |
| 2010/0140262 A1 | 6/2010 | Whitener | |
| 2015/0108148 A1 * | 4/2015 | Lyublinski | E02D 27/38 220/634 |

FOREIGN PATENT DOCUMENTS

| | | |
|---|---|---|
| WO | 2007136514 | 11/2007 |
| WO | 2007136514 A1 | 11/2007 |
| WO | 2008003120 | 1/2008 |
| WO | 2008003120 A1 | 1/2008 |

OTHER PUBLICATIONS

Defendant Sentinel Manufacturing, Inc.'s Unopposed Motion for Leave to File Supplemental Claim Construction Brief, *Asset Guard Products Inc., d.b.a. Falcon Technologies and Services, Inc., v. Sentinel Manufacturing, Inc.* (f/k/a Sentinel Containment, Inc.), In the United States District Court for the Southern District of Texas, Houston Division, Civil Action No. 4:17-CV-00971, Sep. 26, 2018, 3 pp. 64362591.

Defendant Sentinel Manufacturing, Inc.'s Supplemental Claim Construction Brief, *Asset Guard Products Inc., d.b.a. Falcon Technologies and Services, Inc., v. Sentinel Manufacturing, Inc.* (f/k/a Sentinel Containment, Inc.), In the United States District Court for the Southern District of Texas, Houston Division, Civil Action No. 4:17-CV-00971, Sep. 26, 2018, 32 pp. 64543034.

Notice of Appearance, *Asset Guard Products Inc., d.b.a. Falcon Technologies and Services, Inc., v. Sentinel Manufacturing, Inc.* (f/k/a Sentinel Containment, Inc.), In the United States District Court for the Southern District of Texas, Houston Division, Civil Action No. 4:17-CV-00971, Oct. 2, 2018, 2 pp. 6486701.

Plantiff Asset Guard Product Inc.'s d.b.a. Falcon Technologies, Inc., Supplemental Responsive Brief on Claim Construction, *Asset Guard Products Inc., d.b.a. Falcon Technologies and Services, Inc., v. Sentinel Manufacturing, Inc.* (f/k/a Sentinel Containment, Inc.), In the United States District Court for the Southern District of Texas, Houston Division, Civil Action No. 4:17-CV-00971, Oct. 8, 2018, 10 pp. 64995119.

Plaintiff Asset Guard Products Inc.'s and Defendant Sentinel Manufacturing, Inc.'s Claim Construction Chart, *Asset Guard Products Inc., d.b.a. Falcon Technologies and Services, Inc., v. Sentinel Manufacturing, Inc.* (f/k/a/ Sentinal Containment, Inc.), In the United States District Court for the Southern District of Texas, Houston Division, Civil Action No. 4:17-CV-00971, Oct. 31, 2018, 2 pp. 65390835.

Notice of Attorney Appearance, *Asset Guard Products Inc., d.b.a. Falcon Technologies and Services, Inc., v. Sentinel Manufacturing, Inc.* (f/k/a Sentinal Containment), In the United States District Court for the Southern District of Texas, Houston Division, Civil Action No. 4:17-CV-00971, Oct. 31, 2018, 2 pp. 65390835.

Amended Motion for Leave to File Amended Complaint, *Asset Guard Products Inc., d.b.a. Falcon Technologies and Services, Inc., v. Sentinel Manufacturing, Inc.* (f/k/a Sentinal Containment, Inc.), In the United States District Court for the Southern District of Texas, Houston Division, Civil Action No. 4:17-CV-00971, Jan. 15, 2019. 5 pp. 95555515.

Certificate of Conference Regarding Amended Motion for Leave to File Amended Complaint, *Asset Guard Products Inc., d.b.a. Falcon Technologies and Services, Inc., v. Sentinel Manufacturing, Inc.* (f/k/a Sentinal Containment, Inc.) In the United States District Court for the Southern District of Texas, Houston Division, Civil Action No. 4:17-CV-00971, Jan. 16, 2019. 2 pp. 95604366.

Certificate of Conference Regarding Motion for Leave to File Final Infringement Contentions, *Asset Guard Products Inc., d.b.a. Falcon Technologies and Services, Inc., v. Sentinel Manufacturing, Inc.* (f/k/a Sentinal Containment, Inc.), In the United States District Court for the Southern District of Texas, Houston Division, Civil Action No. 4:17-CV-00971, Jan. 16, 2019, 2 pp. 95604367.

Order, *Asset Guard Products Inc.; dba Falcon Technologies and Services, Inc., vs. Sentinel Containment, Inc.*, In the United States District Court of the Southern District of Texas, Houston Division, Civil Action No. 4:17-CV-00971, Feb. 14, 2019, p. 1 104892281.

Amended Scheduling Order, *Asset Guard Products, Inc. d/b/a Falcon Technologies and Services, Inc., v. Sentinel Manufacturing, Inc. f/k/a Sentinal Containment, Inc.*, in the United States District

(56) References Cited

OTHER PUBLICATIONS

Court for the Southern District of Texas, Houston Division, Civil Action No. 4:17-CV-00971, Mar. 8, 2019, 2 pp. 105626141.
Joint Memorandum on Conclusion of ADS Proceedings, *Asset Guard Products Inc., d.b.a Falcon Technologies and Services, Inc., v. Sentinel Manufacturing, Inc.* (f/k/a Sentinal Containment, Inc.), In the United States District Court for the Southern District of Texas, Houston Division, Civil Action No. 4:17-CV-00971, Apr. 16, 2019, 3 pp. 106674247.
Memorandum on Conclusion of ADR Proceedings, *Asset Guard Products Inc., d.b.a. Falcon Technologies and Services, Inc., v. Sentinel Manufacturing, Inc.* (f/k/a Sentinal Containment, Inc.), In the United States District Court for the Southern District of Texas, Houston Division, Civil Action No. 4:17-CV-00971, Apr. 8, 2019, 2 pp. 106782667.
Defendant Sentinel Manufacturing, Inc.'s Partial Motion for Judgment on the Pleadings, *Asset Guard Products Inc., d.b.a. Falcon Technologies and Services, Inc., v. Sentinel Manufacturing, Inc.* (f/k/a Sentinel Containment, Inc.), In the United States District Court for the Southern District of TX, Houston Division, Civil Action No. 4:17-CV-00971, served Apr. 19, 2019, 12 pp. 106782669.
Plantiff Asset Guard Products Inc.'s d.b.a. Falcon Technologies, Inc., Answer to Defendant's Answer, Counterclaims, & Defenses, *Asset Guard Products Inc., d.b.a. Falcon Technologies and Services, Inc., v. Sentinel Manufacturing, Inc.* (f/k/a Sentinal Containment, Inc.), In the United States District Court for the Southern District of Texas, Houston Division, Civil Action No. 4:17-CV-00971, May 10, 2019, 6 pp. 107399201.
Plaintiff Asset Guard Products Inc., dba Falcon Technologies and Services, Inc.'s Response in Opposition to Defendant's Partial Motion for Judgment on the Pleadings, *Asset Guard Products Inc., d.b.a. Falcon Technologies and Services, Inc., v. Sentinel Manufacturing, Inc.* (f/k/a Sentinal Containment, Inc.), In the United States District Court for the Southern District of Texas, Houston Division, Civil Action No. 4:17-CV-00971, May 10, 2019, 13 pp. 107399202.
Defendant Sentinel Manufacturing, Inc.'s Responsive Claim Construction Brief, *Asset Guard Products Inc., d.b.a. Falcon Technologies and Services, Inc., v. Sentinel Containment, Inc.*, United States District Court for the Southern District of Texas, Houston Division, Civil Action No. 4:17-CV-00971, Mar. 21, 2018, 31 pp. primary document 22.
Notice of Resetting, *Asset Guard Products Inc. v. Sentinel Containment, Inc.*, United States District Court for the Southern District of Texas, Houston Division, Civil Action No. 4:17-CV-00971, primary document 30.
Order Granting Defendant Sentinel Manufacturing, Inc.'s Unopposed Motion for Leave to File Supplemental Claim Construction Brief, *Asset Guard Products Inc., d.b.a. Falcon Technologies and Services, Inc., v. Sentinel Manufacturing, Inc.* (f/k/a Sentinel Containment, Inc.), United States District Court for the Southern District of Texas, Houston Division, Civil Action No. 4:17-CV-00971, Oct. 1, 2018, 1 p. primary document 35.
Claim Construction Chart—U.S. Pat. No. 9,410, 302, *Asset Guard Products Inc. v. Sentinel Manufacturing Inc.*, Civil Action No. 4:17-CV-00971, Judge Andrew S. Hanen, Oct. 31, 2018, 15 pp. primary document 39.
Memorandum and Order on Claim Construction, *Asset Guard Products Inc. dba Falcon Technologies and Services, Inc., vs. Sentinel Containment, Inc.,* In the United States District Court for the Southern District of Texas, Houston Division, Civil Action No. 4:17-CV-00971, Nov. 29, 2018, 11 pp. primary document 42.
Amended Complaint for Patent Infringement, Exhibit 1, *Asset Guard Products Inc., d.b.a. Falcon Technologies and Services, Inc., v. Sentinel Manufacturing, Inc.* (f/k/a Sentinel Containment, Inc.), In the United States District Court for the Southern District of Texas, Houston Division, Civil Action No. 4:17-CV-00971, Jan. 15, 2019 exhibit 1.
Plaintiff Asset Guard Products Inc.'s Final Infringement Contentions, Exhibit A, *Asset Guard Products Inc., d.b.a. Falcon Technologies and Services, Inc., v. Sentinel Manufacturing, Inc.* (f/k/a Sentinal Containment, Inc.), In the United States District Court for the Southern District of Texas, Houston Division, Civil Action No. 4:17-CV-00971, Jan. 16, 2019, 44 pp. exhibit A.
Defendant Sentinel Manufacturing Inc.'s Answer, Counterclaims, & Defenses to Amended Complaint, *Asset Guard Products Inc., d.b.a. Falcon Technologies and Services, Inc., v. Sentinel Manufacturing, Inc.* (f/k/a Sentinel Containment, Inc.), United States District Court for the Southern District of Texas, Houston Division, Civil Action No. 4:17-CV-00971, Apr. 19, 2019, 14 pp. primary document 59.
Plaintiff Asset Guard Products Inc.'s d.b.a. Falcon Technologies, Inc., Objections and Responses to Defendant's First Requests for Admission, Exhibit 1, *Asset Guard Products Inc., d.b.a. Falcon Technologies and Services, Inc., v. Sentinel Manufacturing, Inc.* (f/k/a Sentinal Containment, Inc.), In the United States District Court for the Southern District of Texas, Houston Division, Civil Action No. 4:17-CV-00971, Nov. 6, 2018, 7 pp. exhibit 1.
Plaintiff Falcon Technologies and Services, Inc.'s Second Request for Production to Sentinel Manufacturing, Inc. (Nos. 19-23), Exhibit 2, *Asset Guard Products Inc., d.b.a. Falcon Technologies and Services, Inc., v. Sentinel Manufacturing, Inc.* (f/k/a/ Sentinal Containment, Inc.), In the United States District Court for the Southern District of Texas, Houston Division, Civil Action No. 4:17-CV-00971, Apr. 17, 2019, 8 pp.
Order Denying Defendant Sentinel Manufacturing, Inc.'s Partial Motion for Judgment on the Pleadings, *Asset Guard Products Inc., d.b.a. Falcon Technologies and Services, Inc. v. Sentinel Manufacturing, Inc.* (f/k/a Sentinel Containment, Inc.) In the United States District Court for the Southern District of Texas, Houston Division, Civil Action No. 4:17-CV-00971, May 10, 2019, 2 pp.
Complaint for Patent Infringement, *Asset Guard Products Inc., d.b.a. Falcon Technologies and Services, Inc., v. Sentinel Containment, Inc.*, In the United States District Court for the Southern District of Texas, Houston Division, Civil Action No. 4:17-CV-00971, Mar. 29, 2017, 7 pp.
Order for Conference and Disclosure of Interested Parties, *Asset Guard Products Inc. v. Sentinel Containment, Inc.*, United States District Court, Southern District of Texas, Civil Action No. 4:17-CV-00971, Mar. 31, 2017, 4 pp.
Plaintiffs Certificate of Interested Parties, *Asset Guard Products Inc., d.b.a. Falcon Technologies and Services, Inc., v. Sentinel Manufacturing Inc.*, In the United States District Court for Southern District of Texas, Houston Division, Civil Action No. 4:17-cv-00971, Apr. 18, 2017, 1 p.
Notice of Appearance for Defendant Sentinel Containment, Inc., *Asset Guard Products, Inc. v. Sentinel Containment, Inc.*, In the United States District Court for Southern District of Texas, Civil Action No. 4:17-cv-00971, May 10, 2017, 3 pp.
Ex Parte Reexamination Communication Transmittal Form, U.S. Appl. No. 90/014,303, mailed May 20, 2019, 3 pp.
Reexamination file history, U.S. Appl. No. 90/014,303, May 20, 2019, 378 pp.
Defendant Sentinel Manufacturing, Inc.'s Partial Motion for Judgment on the Pleadings, *Asset Guard Products Inc., d.b.a. Falcon Technologies and Services, Inc., v. Sentinel Manufacturing, Inc.* (f/k/a Sentinel Containment, Inc.), In the United States District Court for the Southern District of Texas, Houston Division, Civil Action No. 4:17-cv-00971, Apr. 19, 2019, 12 pp.
Motion for Partial Summary Judgment for Defendant *Sentinel Containment, Inc. v. Plaintiff Asset Guard Products Inc.* In the U.S. District Court for the Southern District of TX Houston Division, Civil Action No. 4:17-CV-971, Oct. 21, 2019, 7 pp.
Notice of Allowance and Fees Due dated Jul. 30, 2019 for U.S. Appl. No. 15/614,720.
Agreed Motion for Amended Scheduling Order, *Asset Guard Products Inc., d.b.a. Falcon Technologies and Services, Inc., v. Sentinel Manufacturing, Inc.* (f/k/a Sentinal Containment, Inc.), In the United States District Court for the Southern District of Texas, Houston Division, Civil Action No. 4:17-CV-00971, Sep. 10, 2018, 3 pp. 64087055 (1).
Plaintiff Asset Guard Products Inc.'s and Defendant Sentinel Manufacturing, Inc.'s Claim Construction Chart, *Asset Guard Products Inc., d.b.a. Falcon Technologies and Services, Inc., v. Sentinel

(56) References Cited

OTHER PUBLICATIONS

*Manufacturing, Inc.* (f/k/a/ Sentinal Containment, Inc.), In the United States District Court for the Southern District of Texas, Houston Division, Civil Action No. 4:17-CV-00971, Oct. 31, 2018, 3 pp. 65390833.
Amended Motion for Leave to File Amended Complaint, *Asset Guard Products Inc., d.b.a. Falcon Technologies and Servies, Inc., v. Sentinel Manufacturing, Inc.* (f/k/a Sentinal Containment, Inc.), In the United States District Court for the Southern District of Texas, Houston Division, Civil Action No. 4:17-CV-00971, Jan. 15, 2019. 5 pp. 95555515.
Plaintiff Asset Guard Products Inc.'s Final Infringement Contentions, Exhibit A, *Asset Guard Products Inc., d.b.a. Falcon Technologies and Services, Inc., v. Sentinel Manufacturing, Inc.* (f/k/a Sentinel Containment, Inc.), In the United States District Court for the Southern District of Texas, Houston Division, Civil Action No. 4:17-CV-00971, Jan. 16, 2019, 44 pp. exhibit A.
Plaintiff Asset Guard Products Inc.'s d.b.a. Falcon Technologies, Inc., Objections and Responses to Defendants First Requests for Admission, Exhibit 1, *Asset Guard Products Inc., d.b.a. Falcon Technologies and Services, Inc., v. Sentinel Manufacturing, Inc.* (f/k/a Sentinel Containment, Inc.), In the United States District Court for the Southern District of Texas, Houston Division, Civil Action No. 4:17-CV-00971, Nov. 6, 2018, 7 pp. exhibit 1.
Plaintiff Falcon Technologies and Services, Inc.'s Second Request for Production to Sentinel Manufacturing, Inc. (Nos. 19-23), Exhibit 2, *Asset Guard Products Inc., d.b.a. Falcon Technologies and Services, Inc., v. Sentinel Manufacturing, Inc.* (f/k/a/ Sentinel Containment Inc.), In the United States District Court for the Southern District of Texas, Houston Division, Civil Action No. 4:17-CV-00971, Apr. 17, 2019, 8 pp.
Versaflex Polyurea Sealants and Coatings:: The Polyurea People; http://www.versaflex.com.
Sherwin-Williams, http://www.sherwin-williams.com/pro/index.jsp.
Sherwin-Williams Envirolastic AR200 HD White.
The Sherwin-Williams Company Material Safety Date Sheet, B81V3300, Mar. 17, 2009.
Office Action dated Jun. 27, 2008, by the USPTO, regarding U.S. Appl. No. 11/426,996.
Notice of Allowance dated Oct. 22, 2008, by the USPTO, regarding U.S. Appl. No. 11/426,996.
Office Action dated Aug. 4, 2010, by the USPTO, regarding U.S. Appl. No. 12/391,106.
Dudley J. Primeaux II, "Polyurea Solves Temporary Issue," Polyurea Development Associate, 2004.
Specification of VFI-210 (210SC80) Secondary Containment Membrane on Geotextile Over Earthen Surfaces, Update Sep. 1999.
Geotextile Coatings, Primeaux Associates LLC.
Spraying over Geotextile, 2001, 2003, 2005 Primeaux Associates LLC, Rev. 03.05.
General Standard: Polyurea/Geotextile Elastomeric Lining Systems, Polyurea Development Association.
http://polyureasystems.com/apps.htm (2005)—Markets and Applications for Spray Polyurea.
Primeaux Associates (2001)—Spraying over Geotextile.
Primeaux and Hanson (Sep. 11, 2006)—The True Polyurea Spray Elastomer Story: Chemistry, Advances, and Applications.
http://www.coastingsworld.com/contents/view/21465 (Aug. 11, 2005)—S-W polyurea helps in fight against.
Office Action dated Dec. 30, 2011, by the USPTO, in U.S. Appl. No. 12/501,307 (9 pages).
Non-Final Office Action dated Jun. 22, 2011, by the USPTO, in U.S. Appl. No. 12/365,781.
Final Office Action dated Oct. 21, 2011, by the USPTO, in U.S. Appl. No. 12/365,781.
Advisory Action dated Dec. 28, 2011, by the USPTO, in U.S. Appl. No. 12/365,781.
Non-Final Office Action dated Jan. 28, 2014, by the USPTO, in U.S. Appl. No. 12/365,781.
Interview Summary dated Mar. 11, 2014, by the USPTO, in U.S. Appl. No. 12/365,781.
Notice of Allowance dated Apr. 11, 2014, by the USPTO, in U.S. Appl. No. 12/365,781.
*Falcon Technologies and Services, Inc.* vs. *Benchmark Foam Inc.*, Complaint for Patent Infringement, Case No. 4:14-cv-00489, filed Jul. 30, 2014.
*Falcon Technologies and Services, Inc.* vs. *All Seasons Foam Coatings & Services LLC*, Complaint for Patent Infringement, Case No. 4:15-cv-00916, filed Apr. 8, 2015.
Office Action dated Jan. 13, 2016 for U.S. Appl. No. 14/285,898.
Order Granting Request for Ex Parte Reexamination dated Jun. 21, 2019 for U.S. Appl. No. 90/014,303.
Non-Final Office Action in Ex Parte Reexamination dated Jun. 28, 2019 for U.S. Appl. No. 90/014,303.
Final Office Action in Ex Parte Reexamination dated Oct. 18, 2019 for U.S. Appl. No. 90/014,303.
Notice of Appearance for Defendant Sentinel Containment, Inc., *Asset Guard Products Inc. v. Sentinel Containment, Inc.*, In the United States District Court for the Southern District of Texas, Civil Action No. 4:17-CV-00971, May 10, 2017, 3 pp. 49391867.
Jury Demand, *Asset Guard Products Inc. d.b.a. Falcon Technologies and Services, Inc., v. Sentinel Containment, Inc.*, In the United States District Court for the Southern District of Texas, Houston Division, Civil Action No. 4:17-CV-00971, Jun. 30, 2017, 11 pp. 51758631.
Joint Report of the Meeting and Joint Discovery/Case Management Plan Under Rule 26(F) of Federal Rules of Civil Procedure, *Asset Guard Products Inc., d.b.a. Falcon Technologies and Services, Inc., v. Sentinel Manufacturing, Inc., f/k/a Sentinal Containment, Inc.*, In the United States District Court for the Southern District of Texas, Houston Division, Civil Action No. 4:17-CV-00971, Jul. 20, 2017, 8 pp. 52035920.
Plaintiff Asset Guard Products Inc.'s d.b.a. Falcon Technologies, Inc., Answer to Defendant's Answer, Counterclaims, & Defenses, *Asset Guard Products Inc., d.b.a. Falcon Technologies and Services, Inc., v. Sentinel Manufacturing Inc.* (f/k/a/ Sentinel Containment, Inc.), In the United States District Court for the Southern District of Texas, Houston Division, Civil Action No. 4:17-CV-00971, mailed Sep. 20, 2017, 5 pp. 52942498.
Agreed Motion for Amended Scheduling Order, *Asset Guard Products Inc., d.b.a. Falcon Technologies and Services, Inc., v. Sentinel Manufacturing, Inc.* (f/k/a/ Sentinel Containment, Inc.) In the United States District Court for the Southern District of Texas, Houston Division, Civil Action No. 4:17-CV-00971, mailed Oct. 9, 2017, 3 pp. 53211045.
Patent Case—Scheduling Order, *Asset Guard Products Inc., d.b.a. Falcon Technologies and Services, Inc., v. Sentinel Manufacturing, Inc.* (f/k/a/ Sentinel Containment, Inc.) In the United States District Court for the Southern District of Texas, Houston Division, Civil Action No. 4:17-CV-00971, mailed Oct. 16, 2017, 6 pp. 53354070.
Notice of Change of Address, *Assest Guard Products Inc., d.b.a. Falcon Technologies and Services, Inc., v. Sentinel Manufacturing Inc.*, In the United States District Court for the Southern District of Texas, Houston Division, Civil Action No. 4:17-CV-00971,mailed Nov. 29, 2017, 2 pp. 53995148.
Plantiff Asset Guard Products Inc.'s and Defendant Sentinel Manufacturing, Inc.'s Joint Claim Construction and Prehearing Statement, *Asset Guard Products Inc., d.b.a. Falcon Technologies and Services, Inc., v. Sentinel Manufacturing, Inc.* (f/k/a/ Sentinel Containment, Inc.), In the United States District Court for the Southern District of Texas, Houston Division, Civil Action No. 4:17-CV-00971, mailed Jan. 31, 2018, 4 pp. 57378440.
Defendant Sentinel Manufacturing, Inc.'s Written Tutorial Concerning Technology Involved in the '302 Patent, *Asset Guard Products Inc., d.b.a. Falcon Technologies and Services, Inc., v. Sentinel Containment, Inc.*, In the United States District Court for the Southern District of Texas, Houston Division, Civil Action No. 4:17-CV-00971, mailed Feb. 28, 2018, 7 pp. 60548080.
Defendant Sentinel Manufacturing, Inc.'s Notice of Nomination of Scott Woloson as a Court-Appointed Expert Witness, *Asset Guard Products Inc., d.b.a. Falcon Technologies and Services, Inc., v. Sentinel Containment, Inc.*, In the United States District Court for

(56) References Cited

OTHER PUBLICATIONS the Southern District of Texas, Houston Division, Civil Action No. 4:17-CV-00971, mailed Feb. 21, 2018, 2 pp. 60545083.
Plaintiff Asset Guard Products Inc.'s d.b.a. Falcon Technologies, Inc., Statement re Court Appointed Special Master or Expert, *Asset Guard Products Inc. d.b.a. Falcon Technologies and Services, Inc., v. Sentinel Manufacturing, Inc.* (f/k/a Sentinel Containment, Inc.), In the United States District Court for the Southern District of Texas, Houston Division, Civil Action No. 4:17-CV-00971, mailed Feb. 21, 2018, 2 pp. 60548097.
Plantiff Asset Guard Products Inc.'s d.b.a. Falcon Technologies, Inc., Opening Claim Construction Brief, *Asset Guard Products Inc., d.b.a. Falcon Technologies and Services, Inc., v. Sentinel Manufacturing, Inc.* (f/k/a Sentinel Containment, Inc.), In the United States District Court for the Southern District of Texas, Houston Division, Civil Action No. 4:17-CV-00971, Mar. 7, 2018, 24 pp. 60802269.
Plaintiff Asset Guard Products Inc.'s d.b.a. Falcon Technologies, Inc., Reply Brief on Claim Construction, *Asset Guard Products Inc., d.b.a. Falcon Technologies and Services, Inc., v. Sentinel Manufacturing, Inc.* (f/k/a Sentinel Containment, Inc.), In the United States District Court for the Southern District of Texas, Houston Division, Civil Action No. 4:17-CV-00971, Mar. 28, 2018, 18 pp. 61237942.
Plantiff Asset Guard Products Inc.'s and Defendant Sentinel Manufacturing, Inc.'s Notice of Estimated Time Requested for Markman Hearing, *Assest Guard Products Inc., d.b.a. Falcon Technologies, Inc., v. Sentinel Manufacturing, Inc.* (f/k/a Sentinel Containment, Inc.), In the United States District Court for the Southern District of Texas, Houston Division, Civil Action No. 4:17-CV-00971, Mar. 28, 2018, 2 pp. 61237943.
Notice of Setting, *Asset Guard Products Inc. v. Sentinel Containment, Inc.*, In the United States District Court for the Southern District of Texas, Civil Action No. 4:17-CV-00971, Apr. 25, 2018, 1 p. 61718890.
Agreed Motion for Amended Scheduling Order, *Asset Guard Products Inc., d.b.a. Falcon Technologies and Services, Inc., v. Sentinel Manufacturing, Inc.*, In the United States District Court for the Southern District of Texas, Houston Division, Civil Action No. 4:17-CV-00971, May 2, 2018, 3 pp. 61860130.
Proposed Patent Case—Scheduling Order, *Asset Guard Products Inc., d.b.a. Falcon Technologies and Services, Inc., v. Sentinel Manufacturing, Inc.* (f/k/a Sentinal Containment, Inc.), In the United States District Court for the Southern District of Texas, Houston Division, Civil Action No. 4:17-CV-00971, May 9, 2018, 7 pp. 62042922.
Notice of Appeal dated Feb. 18, 2020 for U.S. Appl. No. 90/014,303.
Ex Parte Reexamination Advisory Action dated Dec. 31, 2019 for U.S. Appl. No. 90/014,303.
Ex Parte Reexamination Interview Summary dated Dec. 11, 2019 for U.S. Appl. No. 90/014,303.
Office Action dated Aug. 2, 2010, by the USPOT, regarding U.S. Appl. No. 12/391,106.
Office Action dated Dec. 20, 2011 in U.S. Appl. No. 12/501,307 (9 pages).
Final Office Action dated Oct. 17, 2011, by the USPTO, in U.S. Appl. No. 12/365,781.
Office Action dated Jan. 28, 2014 for U.S. Appl. No. 12/365,7818.
Plaintiff Asset Guard Products Inc.'s d.b.a. Falcon Technologies, Inc., Answer to Defendant's Answer, Counterclaims, & Defenses, *Asset Guard Products Inc., d.b.a. Falcon Technologies and Services, Inc., v. Sentinel Manufacturing Inc.* (f/k/a/ Sentinal Containment, Inc.), In the United States District Court for the Southern District of Texas, Houston Division, Civil Action No. 4:17-CV-00971, mailed Sep. 20, 2017, 5 pp. 52942498.
Agreed Motion for Amended Scheduling Order, *Asset Guard Products Inc., d.b.a. Falcon Technologies and Services, Inc., v. Sentinel Manufacturing, Inc.* (f/k/a/ Sentinal Containment, Inc.) In the United States District Court for the Southern District of Texas, Houston Division, Civil Action No. 4:17-CV-00971, mailed Oct. 9, 2017, 3 pp. 53211045.
Patent Case—Scheduling Order, *Asset Guard Products Inc., d.b.a. Falcon Technologies and Services, Inc., v. Sentinel Manufacturing, Inc.* (f/k/a/ Sentinel Containment, Inc.) In the United States District Court for the Southern District of Texas, Houston Division, Civil Action No. 4:17-CV-00971, mailed Oct. 16, 2017, 6 pp. 53354070.
Plantiff Asset Guard Products Inc.'s and Defendant Sentinel Manufacturing, Inc.'s Joint Claim Construction and Prehearing Statement, *Asset Guard Products Inc., d.b.a. Falcon Technologies and Services, Inc., v. Sentinel Manufacturing, Inc.* (f/k/a/ Sentinal Containment, Inc.), In the United States District Court for the Southern District of Texas, Houston Division, Civil Action No. 4:17-CV-00971, mailed Jan. 31, 2018, 4 pp. 57378440.
Plantiff Asset Guard Products Inc.'s d.b.a. Falcon Technologies, Inc., Opening Claim Construction Brief, *Asset Guard Products Inc., d.b.a. Falcon Technologies and Services, Inc., v. Sentinel Manufacturing, Inc.* (f/k/a Sentinal Containment, Inc.), In the United States District Court for the Southern District of Texas, Houston Division, Civil Action No. 4:17-CV-00971, Mar. 7, 2018, 24 pp. 60802269.
Plaintiff Asset Guard Products Inc.'s d.b.a. Falcon Technologies, Inc., Reply Brief on Claim Construction, *Asset Guard Products Inc., d.b.a. Falcon Technologies and Services, Inc., v. Sentinel Manufacturing, Inc.* (f/k/a Sentinal Containment, Inc.), In the United States District Court for the Southern District of Texas, Houston Division, Civil Action No. 4:17-CV-00971, Mar. 28, 2018, 18 pp. 61237942.

\* cited by examiner

TANK BASE

CROSS-REFERENCE TO RELATED APPLICATIONS

This application is a continuation of U.S. application Ser. No. 15/230,890, filed Aug. 8, 2016, which is a continuation of U.S. application Ser. No. 14/285,898, filed May 23, 2014, which is a continuation of U.S. application Ser. No. 12/365,781, filed Feb. 4, 2009, which claims the benefit of the filing date of, and priority to, U.S. Provisional Patent Application No. 61/106,778, filed Oct. 20, 2008, which are hereby incorporated herein by reference.

BACKGROUND OF THE INVENTION

Technical Field

The present invention relates to a structural element that provides load bearing support and the method for the production of same. In particular, an encapsulated polystyrene structure serves as a load bearing material for use in protecting against accidental spills and leaks associated with any type of storage, tank, or vessel.

Description of Related Art

During the production of oil and gas from an underground well, it is common for water to be produced along with the oil or gas. This water, called "produced water," is typically separated from the oil or gas at the well site and temporarily stored in an above-ground storage tank, or AST (or combination of ASTs). The produced water varies in quality from one well to the next, and it can have high quantities of minerals, salts, oil, gas, sand and other substances dissolved, mixed or suspended in it. Produced water with a high concentration of impurities can be corrosive to the walls and ancillary piping of an AST and it can be toxic to the environment. A vehicle with a large storage tank attached to it periodically travels to the well site and transfers the produced water from the AST to the storage tank or vessel on the vehicle.

FIG. 1 illustrates an AST 100 with an input stream 18 and an outlet stream 20. The flow rate of the outlet stream 20 is manipulated by way of a valve 22. The produced water travels from the underground hydrocarbon bearing formation 6, up the oil or gas well bore hole 4, into what is known as a "Christmas tree" 10, which is an assembly of valves, pipes and fittings used to control the flow or oil and gas from a well. The water separating section 14 of the Christmas tree 10 directs the produced water to the AST 100. Other separating sections 12 direct the oil or gas into a pipeline 16, which transports the oil or gas to other locations for further processing or sale. A manway entrance 350 enables a technician to view the interior of the storage tank and inspect the tank for leaks, while the plumbing connections 380 to the storage cavity of said tank enable pumping of the contents therein. As seen in the side view in FIG. 1, the manway 350 extends below the bottom of the tank.

Accidental spills or leaks can occur for a variety of reasons. For example, FIG. 2 illustrates the AST 100 of FIG. 1 after the produced water has corroded the walls of the tank, creating a hole 26 in the wall of the AST. The hole 26 allows the produced water to spill or leak out of the AST 100 and onto the ground 2. In order to protect the environment from an accidental discharge such as the one illustrated in FIG. 2, approved ASTs are typically required to retain any and all fluid such that contaminate are prevented from entering the environment surrounding the well site. Fluid accumulates within ASTs and secondary containment systems from multiple sources including natural and accidental leaks or spills. ASTs usually need to have the capacity and strength to hold at least 150% of the volume of the AST, or for an array of ASTs, 150% of the largest AST in the array.

Currently, protection for the tank, soil and equipment in the containment of the top soil involves the use of a grade band of metal filled with pea gravel below the containment tank. The grade band metal is typically bolted together to form a base greater than the diameter of the containment tank it supports. The diameter of the support structure (base and pea gravel) is typically 3" to 6" greater than that of the AST being supported and allows for the AST to sit approximately 3" to 6" in height off of the floor of a secondary containment area. This allows the AST or containment tank to be at a level greater than the ground level and aids in the slow deterioration of the tank due to any standing fluid within the secondary tank area, whether the fluid is natural (such as rainwater) or accidental (spills or leaks). The pea gravel currently used is naturally porous and allows for the absorption for any number of contaminants (i.e., oil, salts, acids, etc.) that come into contact with the gravel, causing permanent contamination, which still tends to spill out of the gravel upon oversaturation. Attempts to treat or wash out the contaminants are costly, difficult, and to-date, ineffective.

Consequently, a need exists for a more efficient, effective, and convenient method for building an improved tank base to provide for safer environment and green waste. There is a need for an improved tank base, capable of being steam cleaned of any contaminants to provide more environmentally friendly standards while maintaining other advantages of a tank base and reducing costs associated with maintenance or replacement of failing tanks. There is also a need for a tank base that provides for a more efficient and cost-effective means of the shipping, transporting, and installation into customer sites. Further, there is a need for a method which keeps out moisture, preventing the proliferation of bacteria which often causes erosion of tanks from the inside out.

SUMMARY OF THE INVENTION

The present invention provides a method for the encapsulation of a core material, which allows for the adhesion of an elastomer such as polyurea. In one embodiment, at least one part of a substrate such as expanded polystyrene (EPS) is designed or shaped and subsequently coated with polyurea for protection and strength. Preferably, the foam material comprises a density of at least two pounds per cubic foot of foam weight with an average coverage of about 50-80 mils and most preferably about 60 mils polyurea. Other suitable substrates (including without limitation wood, metal, concrete, paper fiber, fiberglass, fiber board, and gravel) allow for the adhesion of polyurea, which is preferably applied using a spray device. This allows for the protection of an above-ground storage tank (AST) system in addition to a more conveniently portable installation.

In a second embodiment, more than one part of a substrate is shaped as desired or needed to fit beneath a tank. Each substrate is individually coated with the polyurea and the coated materials are then fastened together around the outside circumferential periphery of the base and held together under the weight of an AST. The materials comprise at least one seam to allow for moisture to pass through such that no corrosion of the tank is experienced as a result of any standing fluid from accidental spillage or natural rainwater. Once pressure is applied in the form of weight, the fastener can be removed, resulting in an improved tank base having at least one seam and impervious to the fluid of the tank battery or within a secondary containment system. The polyurea-covered EPS is biodegradable and allows for steam cleaning to be rid of contaminating hydrocarbons and green waste disposal, if necessary.

Other aspects, embodiments and features of the invention will become apparent from the following detailed description of the invention when considered in conjunction with the accompanying drawings. The accompanying figures are schematic and are not intended to be drawn to scale. In the figures, each identical or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION OF THE PREFERRED EMBODIMENTS

Figure 1:
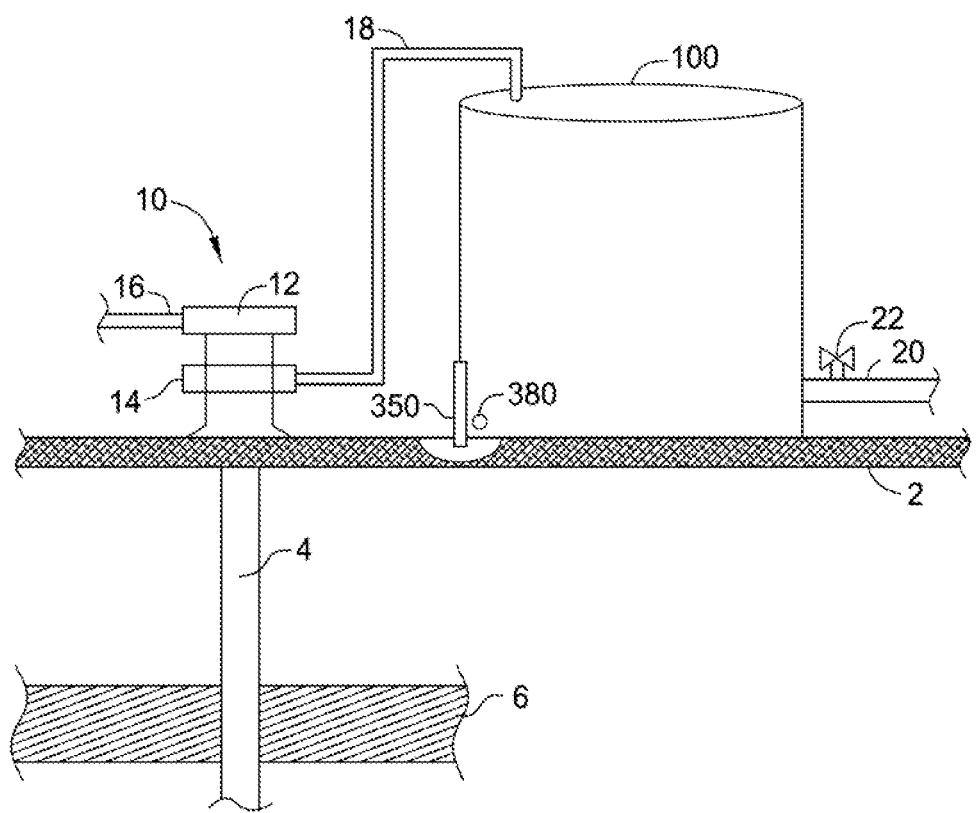
FIG. 1 is an illustration of a prior art above ground storage tank at a well site.
Figure 2:
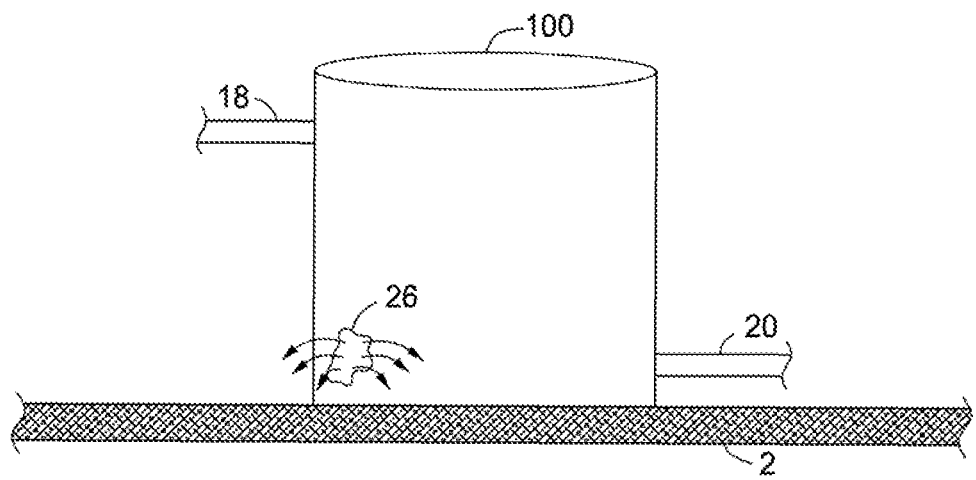
FIG. 2 is an illustration of a prior art above ground storage tank with a hole in its wall.

The present invention involves an improved method for the construction of a tank base for use in a secondary containment area, storage facilities or any type of vessel. While the tank base of the present invention is described in terms of a secondary containment for a varying sizes of an AST, one skilled in the art, armed with this disclosure, will recognize that the present method and its resulting tank base is applicable to any number of secondary containment systems and vessel storage areas. Thus, while FIG. 1 depicts a cylindrical AST with its axis oriented perpendicular to the ground 2, one skilled in the art, armed with this disclosure, will recognize that the claimed invention works equally well within secondary containment systems of varying orientation, shape and positions relative to the ground or environment being protected. Further, as will be described below, the tank base of the present invention can be modified or custom built to accommodate any size and shape desired.

The exterior bottom portion of an AST is particularly susceptible to damage resulting from standing fluid when the AST is sitting directly on the floor of a secondary containment area. As described above, current methods of resolving this problem involves the use of a large tank base having portions bolted together and filled with pea gravel, which permanently absorbs contaminants. Current methods are labor intensive and require multiple parties to construct and supply the tank base.

Figure 3:
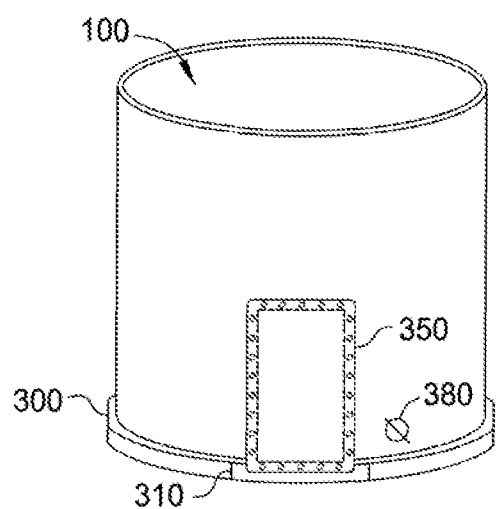
FIG. 3 is an illustration of above ground storage tank situated over a tank base of the present invention.
Figure 4:
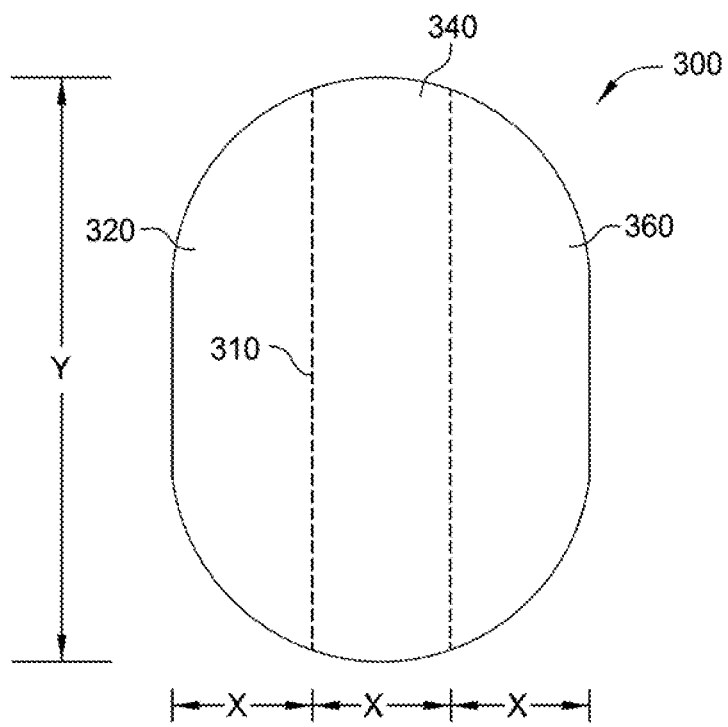
FIG. 4 is an illustration of top perspective view of one embodiment of the tank base of the present invention.

FIG. 3 illustrates an AST 100 situated over the center portion of a tank base 300 of the present invention. As described above, moisture from standing water around the edges of a tank pose a problem for the maintenance of a tank 100 and contamination of the soil beneath the tank. The manway entrance 350 is illustrated in FIG. 3, depicting that portion of the tank to which access is granted for maintaining the tank, and is shown to extend now to the top of the tank base of the present invention. Thus, the containment base allows the tank 100 and plumbing 380 to be situated higher up from the ground, providing easier access through the manway 350. Preferably, any flat portion on the tank base is aligned with the manway entrance 350 to allow for ease of entry. In the embodiment seen in FIGS. 3 and 4, the tank base comprises three parts 320, 340 and 360 and two seams 310 in between each piece; however, as few seams as possible are preferable and if desired, one solid base with no seams is also possible. For ease of transfer and construction, the base is typically comprised of at least two parts or substrates positioned adjacent and secured to one another, creating an outer periphery around which a fastening system is employed to bind the substrates together.

As used herein, the term "suitable substrate" is used synonymously with "substrate" and is meant to include without limitation, concrete, metal, EPS, wood, concrete, paper fiber, fiberglass, fiber board, and gravel or any other substrate appropriate for the adhesion of a polyurea elastomer coating. Polyurea is an elastomer derived from the reaction between an isocyanate component and a resin blend component. Polyurea suitable for the present invention is available from Sherwin Williams under the name ENVIROPLASTIC® AR200HD or Versaflex under the name FSS 50DM. Currently, landfills and dike systems utilize secondary containments comprising EPS encapsulated with earth. Without being bounded by theory, it is believed that the present invention provides an improved tank base in part due to the high compressive strength of EPS in combination with the high adhesion rate and strength of polyurea, which helps encapsulate the polystyrene and keeps it from flaking off and failing under the weight of a the tank. While Applicants describe the present invention in terms of EPS due to its environmentally friendly nature and powerful design elements, other substrates having a compressive strength are also possible. EPS is 100% recyclable and in some parts of the world is currently already being recycled at higher levels than either glass or aluminum. Used polystyrene is biodegradable and has no impact on the environment even in landfill sites or in incinerators, nor does it contain substances that could pollute the air or soil. Further, the manufacture of EPS solutions does not release hydrosoluable substances that could contaminate ground water supplies. Suitable EPS materials are commercially available.

The method by which the present invention is constructed will now be explained. The first step is to design the substrates to be encapsulated as support for a tank battery or in a secondary containment system. As used herein, the designing step is meant to include the cutting, shaping or forming of the substrates into custom shapes or sizes to be used with varying sizes of tanks or within a given containment area. At least one substrate is designed to customer requirements and according to the size and diameter required for the tank battery. As depicted best in FIG. 4, the measurements x and y can vary to any number depending on the secondary containment system or AST to be supported. In test runs, a tank weighing approximately 110 thousand pounds called for EPS having a foam density of 2 pounds per cubic foot of foam weight, ranging from about 3 to 12 inches in height. In addition, the overall diameter of one or more substrates when lying side by side was about 10 to 18 feet in diameter during successful test runs. One skilled in the art, armed with this disclosure, will recognize that one or more substrates can be used in accordance with the present invention. For example, a solid base can be used and alternatively, two solid halves of a base can be placed adjacent to one another and tied together to form a base with at least one seam, which allows for the passage of water to prevent corrosion of the tank. Further, it can be recognized that the foam density can be increased to accommodate more than 100 thousand pounds and to provide the load bearing support needed for the present invention.

The next step involves independently encapsulating each substrate with a polyurea elastomer. Once formed to the necessary specifications or sizes, each substrate is individually coated with polyurea for protection and strength. Preferably, the application is performed using specialized equipment that uses high temperatures and high pressures for mixing directly in an impingement mix spray gun. In one embodiment, the polyurea coating is independently applied using a spray device operating at a temperature of approximately 165 degrees Fahrenheit and a pressure of approximately 1800 pounds per square inch (psi) to encapsulate each substrate. The average coverage of polyurea will be about 50-80 mils, and more preferably about 60 mils coverage. However, one skilled in the art, armed with this disclosure, will recognize that other coverages are also possible depending on the desired compressive strength of the tank base and the required application.

The third step in creating the improved tank containment base of the present invention involves binding the coated substrates together at the well site. The substrates are positioned adjacent to one another and bound together with a fastening system. Simultaneously or subsequently, the substrates can be aligned appropriately as discussed above, with the manway entrance aligned with a flat section of the tank base. When aligning the base, the plumbing features of the tank is also be taken into account such that a flat edge is aligned with the manway entrance and plumbing. In test runs, a 45 foot nylon strap with a cam buckle was used to secure the coated substrates around the outer periphery of the edges and hold the pieces together until the pressure from the weight of the tank is applied. Once properly aligned, the AST is placed on the tank base and the fastening system may be removed, if desired, or may stay in place as the discretion of the owner. The polyurea coating of the tank base is impervious to the fluid of the AST and will not allow for the contamination of the substrate or deterioration of the AST. The coating also allows for ease of cleaning as the material can now be steamed to extract out any hydrocarbon resins. This also allows for the environmentally safe disposal of the base if necessary.

Figure 5:
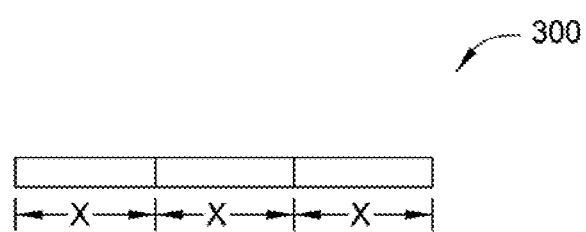
FIG. 5 is an illustration of a side perspective view of the embodiment of the tank base of the present invention seen in FIG. 4.
Figure 6:
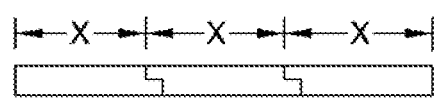
FIG. 6 is an illustration of a side perspective view of an alternate embodiment of the tank base of the present invention.
Figure 7:
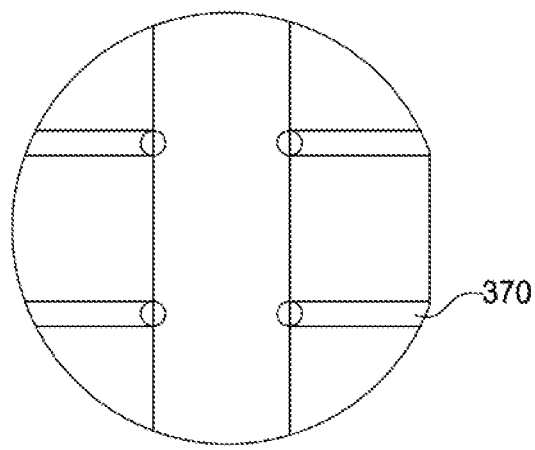
FIG. 7 depicts a top perspective view of an alternate embodiment of the tank base of the present invention.
Figure 8:
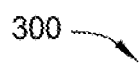
FIG. 8 depicts the side view of the alternate embodiment of the tank base of the present invention illustrated in FIG. 7.
Figure 9:
FIG. 9 depicts an alternate embodiment of the tank base of the present invention.

As seen in FIGS. 4 through 9, the independent nature of the substrates forms seams 310 in between the substrates. It is desirable to have as few seams as possible. FIGS. 5 and 6 illustrate side views of the bases and the corresponding seams possible with the present invention. Straight seams depicted in FIG. 5 allow for any moisture from rainwater, for example, to pass through so as to prevent corrosion of the tank from standing water effects. Interlocking seams seen in FIG. 6 also allow for moisture to seep away from the bottom of the tank but also allow for another embodiment in which to piece or hold together the substrates. It is noteworthy that the secondary containment system should be as level as possible with only a slight gradient to allow fluid to "pool" at one end for removal (i.e. pumping) requirements. Alternatively, FIGS. 7 and 8 depict an alternate embodiment wherein the center substrate portion 340 is slightly raised above the height of side substrate portions 320 and 360. This allows for pooling to occur along either side of the base, rather than in the center of the tank. FIG. 7 further depicts the use of funnels 370 to aid in dispersing fluids away from underneath the tank for release into specific areas within the secondary containment system. FIG. 8 depicts another embodiment of the present invention, comprising a different shape.

While the invention has been particularly described with reference to preferred embodiments, it will be understood by those skilled in the art that various changes in form and detail may be made therein without departing from the spirit and scope of the invention. For example, one skilled in the art, armed with this disclosure, will recognize that a variety of shapes and dimensions are possible with the present invention and can be tailor made according to the needs of a secondary containment system and/or the weight to be applied to the base. Further, the invention can be used in and around any area having highly corrosive or hazardous material and with any vessel or storage container. The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A tank base sized to provide a load-bearing support for an above-ground storage tank, the above-ground storage tank having a bottom and defining an outer circumference, the tank base comprising:
   a first part, comprising:
      a first substrate having a first thickness sized to provide the load-bearing support for the above-ground storage tank; and
      a first elastomer disposed onto an outer surface of the first substrate;
      wherein the first part comprises a first planar portion;
   a second part positioned adjacent to the first part, the second part comprising:
      a second substrate having a second thickness sized to provide the load-bearing support for the above-ground storage tank; and
      a second elastomer disposed onto an outer surface of the second substrate;
      wherein the second part comprises a second planar portion;

wherein the first and second planar portions are coplanar and perpendicular to each of the respective first and second thicknesses of the first and second substrates; and a first seam formed between the first and second parts to allow for fluid to disperse away from the bottom of the tank, via the first seam, when the tank base provides the load-bearing support for the above-ground storage tank.

2. The tank base of claim 1, wherein:

the outer circumference of the tank is generally circular or oblong in shape;

each of the first and second parts comprises a curved edge portion; and each of the respective curved edge portions of the first and second parts forms part of an outer periphery that is generally circular or oblong in shape.

3. The tank base of claim 1, wherein the first and second parts are shaped so that the first seam is interlocking.

4. The tank base of claim 1, wherein the first substrate and the second substrate comprise a foam material having a density of at least about 2 pounds per cubic foot.

5. The tank base of claim 4, wherein the foam material comprises expanded polystyrene, and wherein the first elastomer and the second elastomer comprise a polyurea elastomer.

6. The tank base of claim 1, wherein the first elastomer and the second elastomer each have a thickness of at least about 50 mils, wherein the first thickness and the second thickness are each at least about 3 inches, and wherein at least one of the first and second parts defines a dimension sized to accommodate the outer circumference of the above-ground storage tank and to provide the load-bearing support for the above-ground storage tank, the dimension extending in a direction that is perpendicular to each of the respective first and second thicknesses of the first and second substrates.

7. The tank base of claim 1, wherein the first elastomer is coated onto the outer surface of the first substrate and the second elastomer is coated onto the outer surface of the second substrate.

8. The tank base of claim 1, wherein the first elastomer encapsulates the first substrate and the second elastomer encapsulates the second substrate.

9. The tank base of claim 1, wherein the fluid is a liquid.

10. The tank base of claim 9, wherein the liquid is water.

11. The tank base of claim 10, wherein the first seam is configured to allow for passage of water from the bottom of the tank to a floor of a secondary containment system onto which the tank base is configured to be placed.

12. The tank base of claim 1, further comprising no more than two seams.

13. A method for constructing a tank base sized to provide a load-bearing support for an above-ground storage tank, the above-ground storage tank having a bottom and defining an outer circumference, the method comprising:

providing a first substrate comprising a foam material and having a first thickness sized to provide the load-bearing support for the above-ground storage tank;

applying a first elastomer to an outer surface of the first substrate to provide a first part;

providing a second substrate comprising a foam material and having a second thickness sized to provide the load-bearing support for the above-ground storage tank;

applying a second elastomer to an outer surface of the second substrate to provide a second part;

wherein the first and second parts are configured to interlock with one another thereby forming an interlocking seam between the first and second parts to allow for fluid to disperse away from the bottom of the tank, via the interlocking seam, when the tank base provides the load-bearing support for the above-ground storage tank.

14. The method of claim 13, wherein the first elastomer is sprayed onto the outer surface of the first substrate to provide the first part and the second elastomer is sprayed onto the outer surface of the second substrate to provide the second part.

15. The method of claim 13, wherein the first substrate and the second substrate comprise a foam material having a density of at least about 2 pounds per cubic foot.

16. The method of claim 13, wherein the fluid is liquid water.

17. The method of claim 15, wherein:

the foam material comprises expanded polystyrene, the first elastomer and the second elastomer comprise polyurea, the first elastomer has a thickness of at least about 50 mils once disposed on the first substrate, the second elastomer has a thickness of at least about 50 mils once disposed on the second substrate, the first thickness of the first substrate is at least about 3 inches, and the second thickness of the second substrate is at least about 3 inches.

18. The method of claim 16, further comprising interlocking the first substrate with the second substrate to form the interlocking seam.

19. A tank base sized to provide a load-bearing support for an above-ground storage tank, the above-ground storage tank having a bottom and defining an outer circumference, the tank base prepared by a process comprising:

providing a first substrate comprising a foam material and having a first thickness sized to provide the load-bearing support for the above-ground storage tank;

coating the first substrate with a first elastomer to provide a first part;

providing a second substrate comprising a foam material and having a second thickness sized to provide the load-bearing support for the above-ground storage tank;

coating the second substrate with a second elastomer to provide a second part; and interlocking the first and second parts with one another thereby forming an interlocking seam between the first and second parts to allow for fluid to disperse away from the bottom of the tank, via the interlocking seam, when the tank base provides the load-bearing support for the above-ground storage tank.

20. The tank base of claim 19, wherein the foam material comprises expanded polystyrene, wherein the first elastomer and the second elastomer comprise polyurea, wherein the first elastomer and the second elastomer each have a thickness of at least about 50 mils, and wherein the first thickness and the second thickness are each at least about 3 inches.

21. The tank base of claim 19, wherein the first elastomer is sprayed onto an outer surface of the first substrate to provide the first part and the second elastomer is sprayed onto the outer surface of the second substrate to provide the second part.

22. The tank base of claim 19, wherein the fluid is a liquid.

23. The tank base of claim 22, wherein the liquid is water.

24. A secondary containment system, comprising:
a floor; and a
a tank base sized to provide a load-bearing support for an above-ground storage tank, the above-ground storage tank having a bottom and defining an outer circumference, the bottom disposed on the floor, and the tank base comprising:
 a first part, comprising:
  a first substrate having a first thickness sized to provide the load-bearing support for the above-ground storage tank; and
  a first elastomer disposed onto an outer surface of the first substrate;
  wherein the first part comprises a first planar portion;
 a second part positioned adjacent to the first part, the second part comprising:
  a second substrate having a second thickness sized to provide the load-bearing support for the above-ground storage tank; and
  a second elastomer disposed onto an outer surface of the second substrate;
 wherein the second part comprises a second planar portion;
 wherein the first and second planar portions are coplanar and perpendicular to each of the respective first and second thicknesses of the first and second substrates; and
 a first seam formed between the first and second parts to allow for fluid to disperse away from the bottom of the tank, via the first seam, when the tank base provides the load-bearing support for the above-ground storage tank.

25. The secondary containment system of claim 24, wherein the first and second parts are shaped so that the first seam is interlocking.

26. The secondary containment system of claim 24, wherein the first substrate and the second substrate comprise a foam material having a density of at least about 2 pounds per cubic foot.

27. The secondary containment system of claim 26, wherein the foam material comprises expanded polystyrene, and wherein the first elastomer and the second elastomer comprise a polyurea elastomer.

28. The secondary containment system of claim 24, wherein the first elastomer and the second elastomer each have a thickness of at least about 50 mils, wherein the first thickness of the first substrate and the second thickness of the second substrate are each at least about 3 inches, and wherein at least one of the first and second parts defines a dimension sized to accommodate the outer circumference of the above-ground storage tank and to provide the load-bearing support for the above-ground storage tank, the dimension extending in a direction that is perpendicular to each of the respective first and second thicknesses of the first and second substrates.

29. The secondary containment system of claim 24, wherein the fluid is liquid water and the first seam is configured to allow for passage of water from the bottom of the tank to the floor of the secondary containment system.

30. The secondary containment system of claim 24, wherein the tank base further comprises no more than two seams.

\* \* \* \* \*